(12) United States Patent
Seeley et al.

(10) Patent No.: US 6,997,301 B1
(45) Date of Patent: Feb. 14, 2006

(54) ON-BOARD ENTERTAINMENT DISPLAY RETRACTOR SAFETY DEVICE

(75) Inventors: Steven S. Seeley, Corona, CA (US);
James R. Dan, Yorba Linda, CA (US);
Steven C. Olauson, Alta Loma, CA (US)

(73) Assignee: Rockwell Collins, Cedar Rapids, IA (US)

( * ) Notice: Subject to any disclaimer, the term of this patent is extended or adjusted under 35 U.S.C. 154(b) by 1177 days.

(21) Appl. No.: 09/670,050

(22) Filed: Sep. 25, 2000

(51) Int. Cl.
*A47B 46/00* (2006.01)
*B64D 11/00* (2006.01)

(52) U.S. Cl. ............................... 192/116.5; 244/118.5; 318/282; 318/286; 361/681

(58) Field of Classification Search ............. 192/116.5; 349/58, 60; 340/686.3, 665; 361/682, 681; 318/282, 286, 369, 475; 244/118.5; 348/837; 312/7.2
See application file for complete search history.

(56) References Cited

U.S. PATENT DOCUMENTS

| 2,597,140 | A | * | 5/1952 | Versnel ..................... 192/150 |
| 4,093,055 | A | * | 6/1978 | Blackburn et al. ........ 192/116.5 |
| 4,492,906 | A | * | 1/1985 | Goto et al. ................. 318/475 |
| 4,763,219 | A | * | 8/1988 | Nakamura .................. 192/150 |
| 5,096,271 | A | * | 3/1992 | Portman ..................... 312/7.2 |
| 5,467,106 | A | * | 11/1995 | Salomon ...................... 345/87 |
| 5,743,487 | A | * | 4/1998 | Rice ........................... 244/1 R |
| 5,811,791 | A | * | 9/1998 | Portman ..................... 250/221 |
| 6,256,078 | B1 | * | 7/2001 | Ogata .......................... 349/58 |
| 6,424,386 | B1 | * | 7/2002 | Shimizu ..................... 348/837 |
| 6,445,573 | B1 | * | 9/2002 | Portman et al. ............. 349/58 |

* cited by examiner

*Primary Examiner*—Rodney H. Bunck
(74) *Attorney, Agent, or Firm*—Nathan O. Jensen; Kyle Eppele

(57) ABSTRACT

The present invention comprises a clutch assembly having a housing, rotational arm and torque spring, in combination with a position sensor, such that excessive movement or obstruction within the path of the display assembly during deployment, as predefined by the system designer, results in stowage of a deployed on-board entertainment system display assembly.

15 Claims, 5 Drawing Sheets

ON-BOARD ENTERTAINMENT DISPLAY RETRACTOR SAFETY DEVICE

BACKGROUND OF THE INVENTION

This invention relates to entertainment systems and more specifically to retractable display assemblies integrated into entertainment systems utilized on transportation vehicles.

Today's world involves numerous situations in which one is required to endure trips of varying distance and time for both pleasure and work reasons. To accomplish these travels a wide assortment of personal and commercial vehicles including automobiles, buses, ships, trains and aircraft are relied upon on a daily basis. For those individuals not operating the respective vehicle, the duration of the trip provides a captive situation which is often addressed by access to wireless broadcast information, such as television, or viewing pre-recorded information stored on the vehicle for playback during the trip. Such systems are often referred to as on-board or mobile entertainment systems. With advances in electronics in recent years, with respect to size, cost and ruggedness, such on-board entertainment systems are commonly found in numerous vehicles.

During normal deployment and operation, certain unplanned conditions may arise that will cause the system to retract and stow the display assembly. These conditions are generally related to passenger or foreign objects exerting unplanned force on the display assembly. Such situations may be reduced to predetermined force limits that initiate a desire by the on-board entertainment system operator to retract the display assembly. A method and apparatus for determining and responding to such conditions is necessary in order to accommodate such situations.

Accordingly, a need exists for an on-board entertainment system incorporating a display housing system that secures stowage and deployment, while deflecting predictable extreme applied force is highly desirable.

SUMMARY OF INVENTION

The present invention relates to an entertainment system for use in vehicular applications that comprises a mounting system for securing a display assembly. The present invention comprises a drive motor, a clutch mechanism, a sensor and logic circuitry for use in an on-board entertainment system in combination and configured in such a manner that a pre-determined range of display assembly movement is provided, however, once the intended range limit is exceeded the display assembly receives a retract command. In one embodiment the drive motor is a rotational motor having an affixed arm to its shaft coupled to the display housing for controlled display assembly movement. A clutch device comprised of a hub, biasing apparatus and clutch arm is disposed in relationship to said extension arm so as to allow limited movement of said extension arm without a change in state of the commanded stow/retract signal. A sensor, preferably optical is contiguous with said clutch. Upon exceeding predetermined allowable movement, said sensor provides a signal to electrically coupled logic circuitry, thereby commanding the display assembly to retract.

It is an object of the present invention to provide an on-board entertainment system that minimizes display deployment in unsafe conditions.

It is a feature of to utilize a rotational motor having a mechanical clutch that provides a range of allowable movement of a deployed display assembly.

It is an advantage of the present invention that predetermined contact conditions by foreign objects with the display assembly will not harm the on-board entertainment system or foreign object.

These and other objects, features, and advantages are disclosed in the specification, figures, and claims of the present invention.

DETAILED DESCRIPTION

Figure 1:
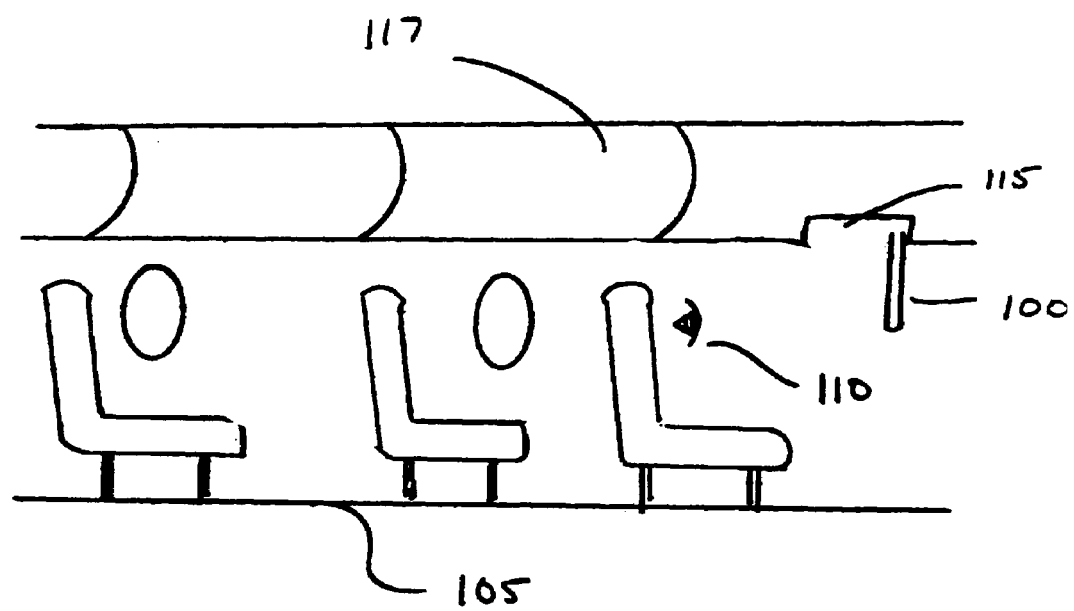
FIG. 1 is a diagrammatic view of the passenger compartment of a vehicle, which includes an on-board entertainment system having a deployed display assembly.

Referring now to the drawings wherein like numerals refer to like matter. FIG. 1 shows the display 100 of an entertainment/information system in the passenger portion of a vehicle 105, which incorporates the teachings of the present invention. The display is depicted in a deployed or extended position from its stowed location in cavity 115 of the ceiling panel 117 of the vehicle 105. Although not shown, the display assembly is coupled to additional components of the entertainment system for receiving power and content signals.

Figure 2:
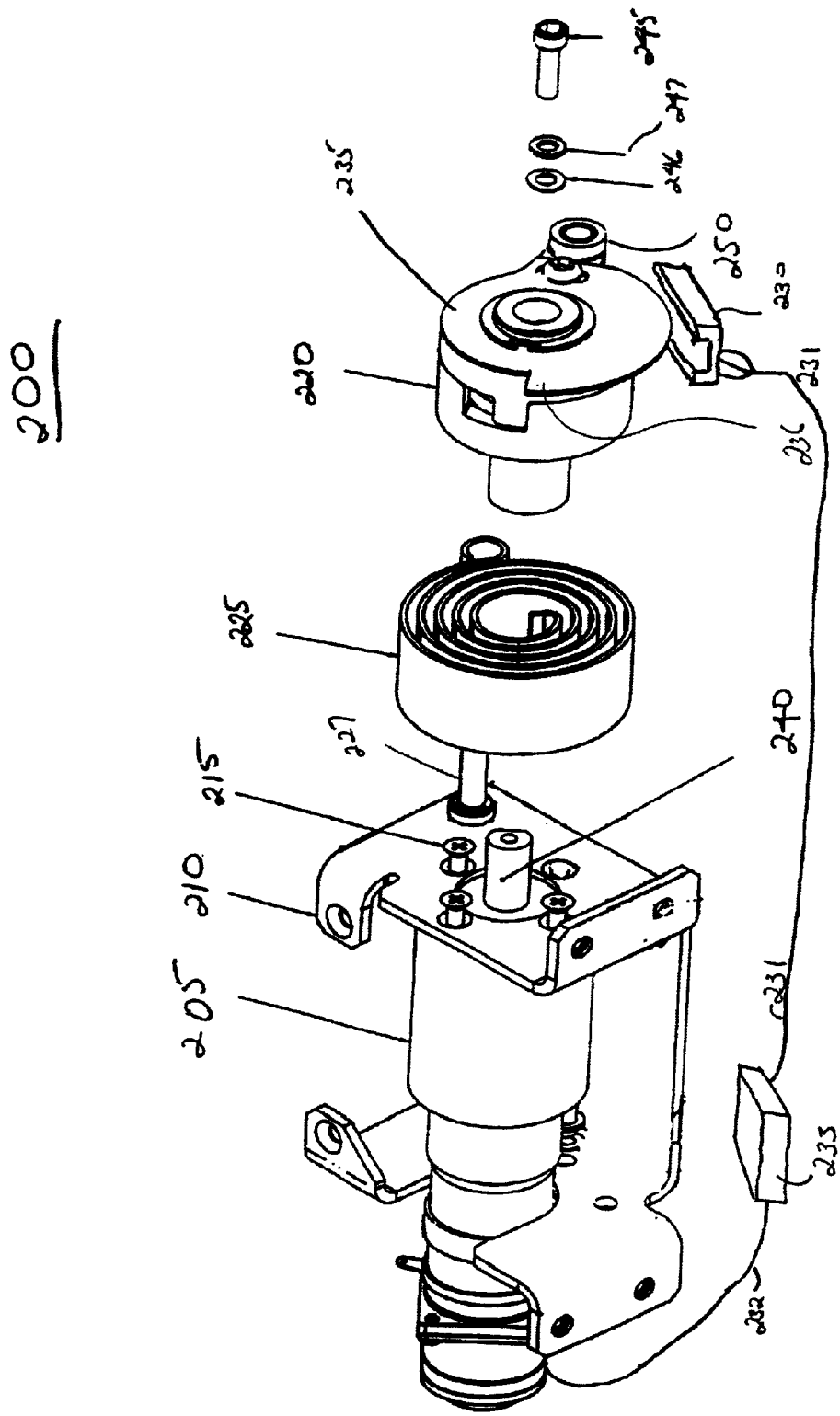
FIG. 2 is an exploded view of one embodiment of an on-board entertainment system display retract assembly incorporating the features of the present invention.

FIG. 2 is an exploded view of one embodiment of a on-board entertainment system retractor display assembly 200 that incorporates the teachings of the present invention. The assembly, as shown is comprised of five primary components. An actuator 205 for movement of the display from a stored to deployed and returned condition is required. Actuator 205 is a rotary direct current motor readily available from commercial suppliers. Various mounting brackets and associated hardware 210 and 215 are necessary for securing the retractor display assembly in a fixed location. It is understood that the physical parameters of the mounting brackets are dependent upon such factors as the dimensions and configuration of the portion of the vehicle containing the on-board entertainment display assembly and other designer choices without departing from the spirit of the present invention.

A clutch assembly 220 is affixed about one end of the motor shaft 240. A biasing means 225, such as spiral torsion spring, a plurality of electronic capacitors or other similar means, is disposed between one end of the actuator-mounting bracket 210 and the clutch assembly 220. The biasing means may be anchored to the bracket 210 via shaft 227 and provides for angular resistance to the assembled clutch and retract mechanism. A sensor 230, optical as depicted works in conjunction with an indicator 235 to determine excessive display motion. The sensor is coupled to the motor control device 233 via cabling 231 and provides an signal to the actuator control logic upon the rotation of the indicator 235 in such manner that the surface area of indicator 235 exceeds the step region 236. The clutch assembly is affixed to the shaft of the motor 205 and serves to retain the biasing means 225 about the motor shaft 240, by the use of any standard fasteners, such as a flat washer 246, a lock washer 247 and a hexagonal screw cap 245, or other appropriate fastener combination. The clutch assembly is in turn coupled to an engagement lever and the display assembly (not shown) via connection point 250. When assembled the biasing means 225 is under tension with respect to the clutch assembly.

Figure 3:
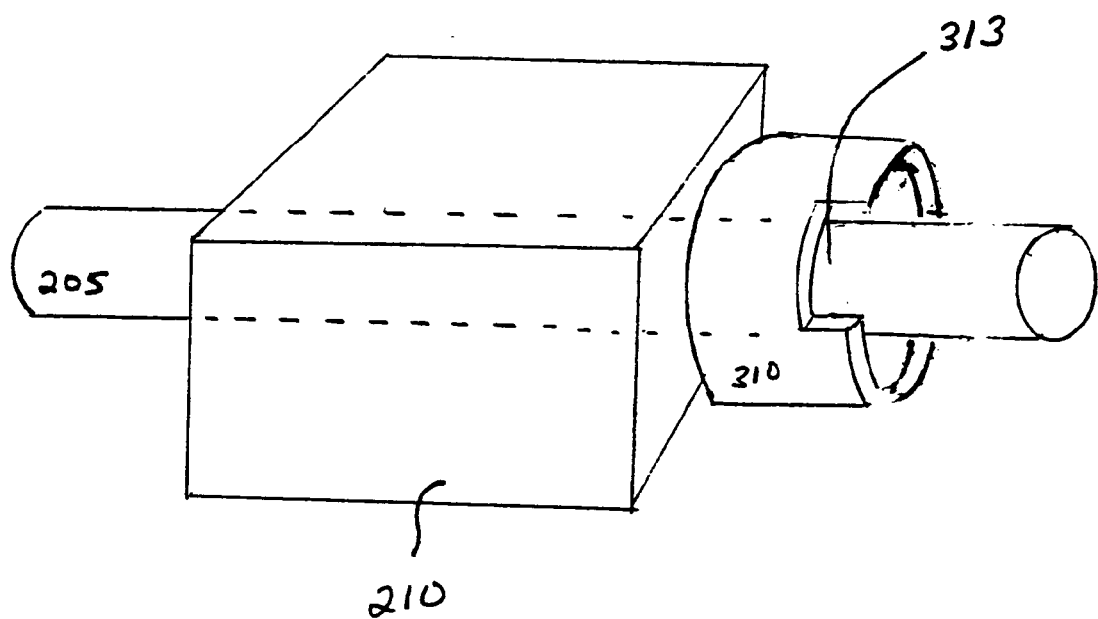
FIG. 3 is a perspective view of the clutch hub and motor assembly of the embodiment of FIG. 2.

FIG. 3 is a perspective view of one embodiment of a portion of the retractor and clutch assembly, illustrated in FIG. 2. As shown, the actuator motor 205 is affixed within a mounting bracket 210. Disposed about one end of the shaft of the motor 205, is the clutch inner element 310. The clutch inner element may take any desired design shape and dimensions as preferred or warranted by its intended environment and may similarly be of a wide variety of compositions including plastic, metal, or some combination thereof. The clutch inner element includes in its periphery edge a via or passageway 313 of a predetermined and fixed dimension.

Figure 4:
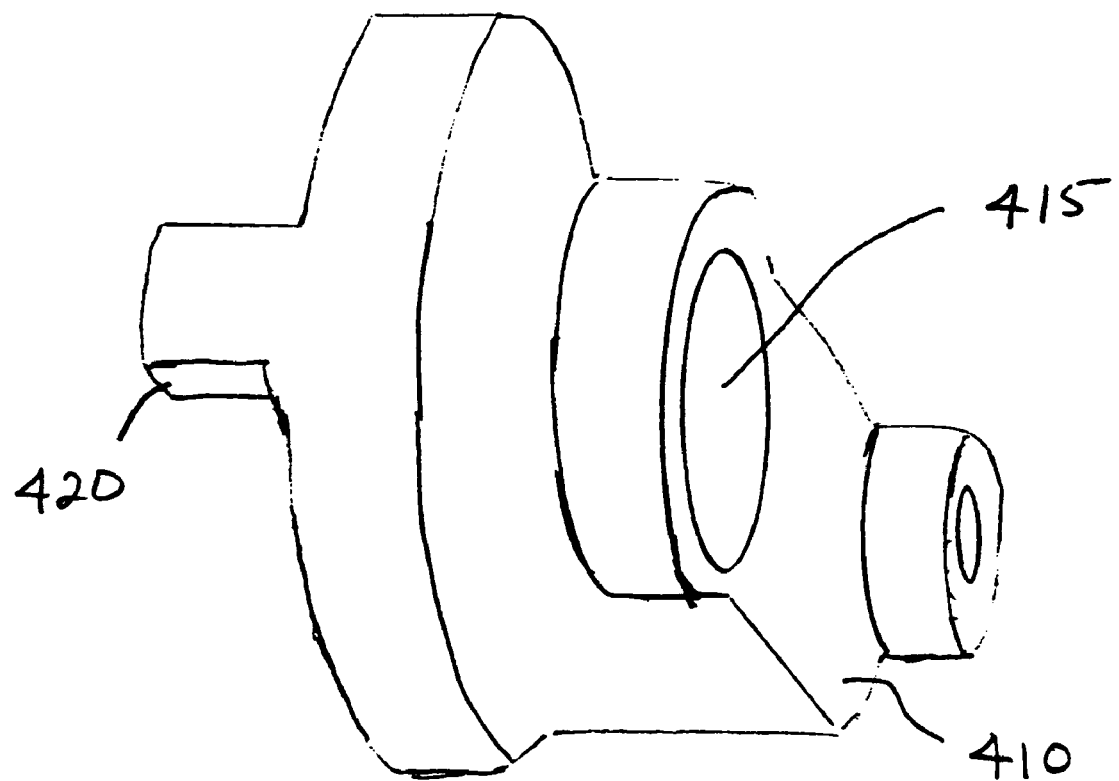
FIG. 4 is a perspective view of a portion of the clutch assembly.

FIG. 4 is a perspective view of one embodiment of a portion of the clutch assembly, illustrated in FIG. 2, specifically the clutch outer element 410. As with the clutch inner element (described above), the clutch outer element may take any desired design shape and dimensions as preferred or warranted by its intended environment and may similarly be of a wide variety of compositions including plastic, metal, or some combination thereof. However the overall dimensions and parameters of each of the clutch elements should be complementary in nature. The clutch outer element 410 is comprised of a single component having a generally described elongated shape and providing for a hubbed region and opening 415 for accommodation of the inner clutch and motor shaft (FIG. 2). Along the periphery of the hubbed region is a protrusion 420 within the same reference axis as the inner clutch and motor shaft upon assembly of the clutch elements and motor. The physical parameters of the protrusion 420 are such that the protrusion is completely described within the passageway 313 (FIG. 3) of the clutch inner element. It is understood that the passageway 313 is of such dimension that the assembled clutch elements allow for rotational movement about the inner clutch and motor shaft within the limits described by the protrusion 420 on the clutch outer element contacting opposite sides of the passageway 313 of the clutch inner element.

Figure 5:
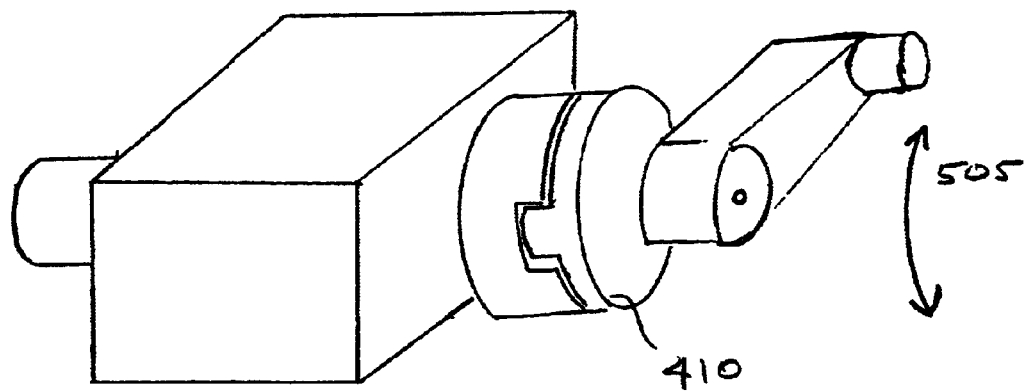
FIG. 5 is a perspective view of the clutch hub, clutch arm and motor assembly of the embodiment of FIG. 2.

FIG. 5 depicts in a perspective view the assembled clutch assembly 220. Movement of the clutch outer element 410 in the manner described by arrow 505 is determined by extension of a display assembly coupled to the clutch assembly and its movement via a force other than the intended deployment via the retractor assembly or alternatively by its failure to move in response to force exerted by the retractor assembly. The biasing mechanism of the clutch assembly may be external to or contained within the clutch outer and inner elements.

The display assembly of the entertainment system is normally stored when the system is not in use. In order to deploy the display assembly for passenger viewing, the retractor assembly receives an enabling command to enable the actuator motor for a predetermined time or until a given or sensed condition exists, consistent with normal deployed display placement. Should the attempted deployment of the display assembly encounter a foreign object, such as a person or baggage within the area of the deployed display, the resulting force of such foreign object in opposition to the actuator force will counteract the attempted display deployment. The clutch assembly allows for a predetermined force equivalent to the force necessary to deform the torsion spring and move the outer element to its unbiased position, no greater than the distance described by the clutch inner element passageway 313. The rotational movement of the clutch outer element with respect to the inner element is detected by the sensor 230 in combination with the simultaneous movement of the indicator 235, which results in an assembly retract signal being sent to the actuator 205 and the immediate storage of the display assembly. In this manner the display assembly and foreign object are no longer in contact or in danger of harming one or the other or both. A reset signal may be provided for, such that a user may attempt to deploy the display assembly once the foreign object has been removed. The clutch assembly will also function in the manner described above when the display assembly encounters a force that equates to the backside of the display being forced towards the viewing side of the display assembly.

It is understood that, while the detailed drawings, specific examples, and particular values given describe preferred exemplary embodiments of the present invention, they are for the purpose of illustration only. The apparatus and method of the present invention is not limited to the precise details of the conditions disclosed. Accordingly, changes may be made to the details disclosed without departing from the spirit of the invention the scope of which should be determined by the following claims.

What is claimed is:

1. A system for controlling the stowage of a display assembly of an on-board entertainment system, comprising:
    an actuator for intended movement of said display assembly;
    a clutch mechanically coupled to said actuator; and
    a sensor for sensing relative position of said display assembly; and
        logic means coupled to said actuator and sensor; wherein
        upon movement of a deployed display assembly beyond a predetermined limit, the sensor provides a signal to said logic means which in turn activates said actuator to retract said display assembly.

2. The system of claim 1, wherein the clutch is comprised of an outer element having an integrated stop, an inner element having a region for engaging said stop, and biasing means for providing resistance of movement of the clutch outer element.

3. The system of claim 2, wherein the biasing means is a spiral torsion spring.

4. The system of claim 1, wherein the actuator device is an electric motor.

5. The system of claim 1, further comprising an indicator plate affixed to a clutch outer element.

6. The system of claim 1, wherein the sensor is an optical sensor.

7. The system of claim 1, wherein the sensor is a mechanical device.

8. A retractor assembly for controlling the movement of a display assembly of an on-board entertainment system, comprising:
    an actuator rigidly affixed to a vehicle having an on-board entertainment system;
    a clutch assembly mechanically coupled to said actuator and to the display;
    an indicator plate affixed to said clutch assembly;
    a sensor for sensing relative position of said indicator plate; and
    logic means coupled to said actuator and sensor;
        wherein upon the movement of the indicator plate beyond a predetermined limit, the sensor provides a signal to said logic means which in turn activates a said actuator to retract said display assembly.

9. The system of claim 8, wherein the clutch is comprised of an outer element having an integrated stop, an inner element having a region for engaging said stop, and a biasing means, within the outer element and inner element for providing resistance of movement of the clutch outer element.

10. The system of claim 9, wherein the biasing means is a spiral torsion spring.

11. The system of claim 8, wherein the actuator device is an electric motor.

12. The system of claim 8, further comprising an indicator plate affixed to said clutch outer element.

13. The system of claim 8, wherein the sensor is an optical sensor.

14. The system of claim 8, when the sensor is a mechanical device.

15. A method for controlling the movement of an on-board entertainment system display assembly having a retractor motor, clutch assembly, and movement sensor, comprising the steps of:

activating the retractor motor in a first direction in response to a deploy command from the on-board entertainment system;

monitoring, via the sensor, the relationship of various components of the clutch assembly, representative of an unintended force contacting the display assembly; and activating the retractor motor in a second direction, in order to store the display assembly.

* * * * *